United States Patent Office 3,658,967
Patented Apr. 25, 1972

3,658,967
CARBOXYLIC ACID DERIVATIVES FOR LOWERING THE CONCENTRATION OF TRIGLYCERIDES IN THE BLOOD
Thomas Leigh and Leslie Arthur McArdle, Macclesfield, England, assignors to Imperial Chemical Industries Limited, London, England
No Drawing. Continuation-in-part of application Ser. No. 644,489, June 8, 1967. This application May 14, 1970, Ser. No. 37,317
Claims priority, application Great Britain, June 23, 1966, 28,198/66, 28,200/66
Int. Cl. A61k 27/00
U.S. Cl. 424—317    11 Claims

ABSTRACT OF THE DISCLOSURE

The disclosure relates to a method for lowering the concentration of cholesterol, triglycerides or fibrinogen in the blood by administering a pharmaceutical composition containing as active ingredient a phenylbenzyloxy-alkanoic acid derivative, for example α-[4-(p-chlorophenyl)benzyloxy]-α-methylpropionic acid.

---

This application is a continuation-in-part of co-pending U.S. Ser. No. 644,489, filed June 8, 1967 now Pat. No. 3,549,690.

This invention relates to new carboxylic acid derivatives which possess valuable therapeutic properties.

It is believed that certain diseases such as coronary artery disease and atherosclerosis in man are associated with an abnormally high concentration of triglycerides and/or cholesterol in the blood serum. We have now found that certain aryl derivatives of aliphatic acids reduce the concentration of cholesterol and/or triglycerides in the blood serum of rats, and also reduce the level of fibrinogen in the blood plasma of rats. The said derivatives also possess antiinflammatory activity in rats.

According to the invention we provide new carboxylic acid derivatives of the formula:

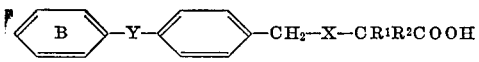

wherein X stands for the oxygen or sulphur atom or for the imino (—NH—) or sulphonyl (—SO$_2$—) radical; wherein Y stands for a direct linkage, or for the oxygen or sulphur atom, or for the sulphonyl radical, or for a radical of the formula —CR$^1$R$^2$—; wherein R$^1$ and R$^2$, which may be the same or different, stand for hydrogen or for alkyl radicals; and wherein ring B may optionally be substituted by one or more radicals selected from halogen atoms and alkyl radicals, and the esters and amides and salts thereof.

As suitable esters of the carboxylic acid derivatives of the invention there may be mentioned, for example, esters derived from a monohydric alcohol of the formula R$^3$OH, wherein R$^3$ stands for an alkyl, alkoxyalkyl, aminoalkyl, alkylaminoalkyl, dialkylaminoalkyl or alkyleneiminoalkyl radical, or esters derived from a polyhydric alcohol of the formula D—(OH)$_n$, wherein D stands for a straight- or branched-chain alkylene radical and n is an integer from 2 up to the number of carbon atoms in the alkylene radical D, provided that not more than one hydroxyl radical is attached to any one carbon atom of the alkylene radical D.

As suitable amides of the carboxylic acid derivatives of the invention there may be mentioned, for example, amides derived from an amine of the formula R$^4$R$^5$NH, wherein R and R, which may be the same or different, stand for hydrogen or for alkyl, alkoxyalkyl, aminoalkyl, alkylaminoalkyl, dialkylaminoalkyl, alkyleneimino-alkyl, carboxyalkyl or alkoxycarbonylalkyl radicals, or wherein R$^4$ and R$^5$ are joined together with the adjacent nitrogen atom to form a heterocyclic radical.

As a suitable value for R$^1$, R$^2$, R$^3$, R$^4$ or R$^5$ when it stands for an alkyl radical, or as a suitable value for the alkyl radical which may be a substituent in ring B, there may be mentioned, for example, an alkyl radical of not more than 4 carbon atoms, for example the methyl or ethyl radical.

As a suitable value for the halogen atom which may be a substituent in ring B there may be mentioned, for example, the chlorine or bromine atom.

As a suitable value for Y when it stands for a radical of the formula —CR$^1$R$^2$— there may be mentioned, for example, the methylene (—CH$_2$—) radical.

As a suitable value for R$^3$, R$^4$ or R$^5$ when it stands for an alkoxylalkyl, aminoalkyl, alkylaminoalkyl, dialkylaminoalkyl or alkyleneiminoalkyl radical there may be mentioned, for example, an alkyl radical of 2, 3 or 4 carbon atoms, for example the ethyl or propyl radical, which is substituted by an alkoxy radical of not more than 4 carbon atoms, for example the methoxy or ethoxy radical, or by an amino radical, or by an alkylamino radical of not more than 4 carbon atoms, for example the methylamino or ethylamino radical, or by a dialkylamino radical wherein neither alkyl part contains more than 4 carbon atoms, for example the dimethylamino or diethylamino radical, or by an alkyleneimino radical of not more than 6 carbon atoms, which may optionally be interrupted by an oxygen atom, for example the pyrrolidino, piperidino or morpholino radical. Thus, a particular value for R$^3$, R$^4$ or R$^5$ when it stands for an alkoxyalkyl, aminoalkyl, alkylaminoalkyl, dialkylaminoalkyl or alkyleneiminoalkyl radical is, for example, the β-ethoxyethyl, β-dimethylaminoethyl, β - diethylaminoethyl, γ - dimethylaminopropyl or β-morpholinoethyl radical.

As a suitable value for D there may be mentioned, for example, a straight- or branched-chain alkylene radical of not more than 6 carbon atoms, and as a suitable value for n there may be mentioned, for example, an integer from 2 to 6. Particular polyhydric alcohols of the formula D—(OH)$_n$ are, for example, propylene-1,3-diol and glycerol. It is to be understood that not all the hydroxyl radicals attached to the alkylene radical D need be esterified by the carboxylic acids of the invention.

As a suitable value for R$^4$ or R$^5$ when it stands for a carboxyalkyl or alkoxycarbonylalkyl radical there may be mentioned, for example, an alkyl radical of not more than 4 carbon atoms which is substituted by a carboxy radical or by an alkoxyocarbonyl radical of not more than 5 carbon atoms, for example the methoxycarbonyl or ethoxycarbonyl radical. Thus, a particular value for R$^4$ or R$^5$ when it stands for a carboxyalkyl or alkoxycarbonylalkyl radical is, for example, the carboxymethyl or ethoxycarbonylmethyl radical.

As a suitable value for the heterocyclic radical formed by R$^6$, R$^5$ and the adjacent nitrogen atom there may be mentioned, for example, a heterocyclic radical of not more than 7 ring atoms, for example the pyrrolidino, piperidino, morpholino or hexamethyleneimino radical.

As suitable salts of the carboxylic acids of the invention, or of the amides thereof as defined above wherein R$^4$ and/or R$^5$ stands for a carboxyalkyl radical, there may be mentioned, for example, metal salts, for example alkali metal or alkaline earth metal salts, for example sodium, potassium, magnesium or calcium salts, or aluminium or bismuth salts, or ammonium salts.

A preferred group of new carboxylic acid derivatives of the invention comprises compounds of the formula:

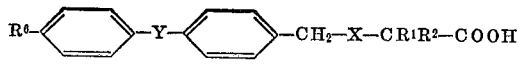

wherein $R^1$, $R^2$, X and Y have the meanings stated above and wherein $R^6$ stands for a halogen atom or for an alkyl radical and the esters and amides and salts thereof. A particularly preferred group of new carboxylic acid derivatives comprises those compounds of the above formula wherein X and Y have the meanings stated above, wherein $R^1$ and $R^2$ both stand for the methyl radical, and wherein $R^6$ stands for the chlorine atom or for the methyl radical, and the esters and amides and salts thereof.

Suitable esters and amides and salts of the preferred group of carboxylic acids are those defined above.

Particular new carboxylic acid derivatives of the invention are, for example,

α-[4-(p-chlorophenyl)benzyloxy]-α-methylpropionic acid and the salts thereof;
α-(4-phenylbenzyloxy)-α-methylpropionic acid and the salts thereof;
α-[4-(p-chlorophenyl)benzyloxy]acetic acid and the salts thereof;
α-[4-(p-chlorophenoxy)benzyloxy]-α-methylpropionic acid and the salts thereof;
α-[4-(p-chlorophenyl)benzylthio]acetic acid and the salts thereof;
α-[4-(p-chlorophenyl)benzyloxy]-α-methylbutyric acid;
methyl α-[4-(p-chlorophenyl)benzylamino]acetate;
α-[4-(p-chlorophenyl)benzyloxy]-α-methylpropionamide;
N-methyl-α-[4-(p-chlorophenyl)benzyloxy]-α-methylpropionamide;
N-methoxycarbonylmethyl-α-[4-(p-chlorophenyl)benzyloxy]-α-methylpropionamide;
N-carboxymethyl-α-[4-(p-chlorophenyl)benzyloxy]-α-methylpropionamide;
ethyl α-[4-(p-chlorophenyl)benzyloxy]-α-methylpropionate;
2-dimethylaminoethyl α-[4-(p-chlorophenyl)benzyloxy]-α-methylpropionate;
2-ethoxyethyl α-[4-(p-chlorophenyl)benzyloxy]-α-methylpropionate;
α-[4-(p-tolylthio)benzyloxy]-α-methylpropionic acid and the salts thereof;
α-[4-(p-chlorobenzyl)benzyloxy]-α-methylpropionic acid and the salts thereof;
α-[4-(p-tolylsulphonyl)benzyloxy]-α-methylpropionic acid and the salts thereof;
α-[4-(p-chlorophenyl)benzyloxy]propionic acid and the salts thereof; and
α-[4-(p-chlorophenyl)benzylsulphonyl]acetic acid and the salts thereof.

According to a further feature of the invention we provide a process for the manufacture of those of the carboxylic acid derivatives of the invention and the esters and amides and salts thereof wherein X stands for the oxygen or sulphur atom which comprises the interaction of a metal derivative of the formula:

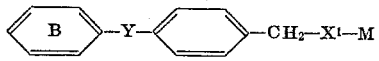

wherein B and Y have the meanings stated above, wherein $X^1$ stands for the oxygen or sulphur atom and wherein M stands for a metal atom, with a carboxylic acid of the formula:

$$Z—CR^1R^2COOH$$

wherein $R^1$ and $R^2$ have the meanings stated above and wherein Z stands for a halogen atom, or with an ester or amide or salt thereof.

As a suitable metal atom M there may be mentioned, for example, an alkali atom, for example the sodium atom.

As a suitable value for the halogen atom Z there may be mentioned, for example, the chlorine, bromine or iodine atom.

The process may be carried out in a diluent or solvent, for example benzene, toluene, xylene, ethanol or dimethylformamide, and it may be carried out at ambient temperature or it may be accelerated or completed by the application of heat, for example by heating at the boiling point of the diluent or solvent.

It is to be understood that when the carboxylic acid itself, or an amide thereof as defined above wherein $R^4$ and/or $R^5$ stands for a carboxyalkyl radical, is used as starting material then a sufficient excess of the metal derivative starting material must be used to neutralise all the carboxyl groups in the first-mentioned starting material.

According to a further feature of the invention we provide a process for the manufacture of those of the carboxylic acid derivatives of the invention and the esters and amides and salts thereof wherein X stands for the oxygen or sulphur atom or for the imino radical which comprises the interaction of a compound of the formula:

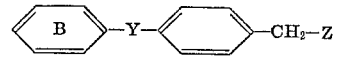

wherein B, Y and Z have the meanings stated above, with an ester, amide or salt of a carboxylic acid derivative of the formula:

$$M—X^2—CR^1R^2·COOH$$

wherein $R^1$, $R^2$ and M have the meanings stated above and wherein $X^2$ stands for the oxygen or sulphur atom or for the imino radical.

The latter process may be carried out in a diluent or solvent, for example benzene, toluene, xylene or dimethylformamide, and it may be carried out at ambient temperature or it may be accelerated or completed by the application of heat, for example by heating at the boiling point of the diluent or solvent.

According to a further feature of the invention we provide a process for the manufacture of those of the carboxylic acid derivatives of the invention wherein either or both of X and Y stand for sulphonyl radicals which comprises the oxidation of the corresponding carboxylic acid derivative of the invention wherein respectively either or both of X and Y stand for sulphur atoms.

The said oxidation may be carried out using an alkali metal permanganate, for example potassium permanganate, or hydrogen peroxide as oxidizing agent, and it may be carried out in a diluent or solvent, for example aqueous acetic acid.

The carboxylic acid derivatives of the invention may be converted into the esters or amides or salts thereof by conventional means, and the esters of the carboxylic acid derivatives may be converted into the amides of the carboxylic acid derivatives by conventional means. Alternatively, the esters or amides of the carboxylic acid derivatives may be hydrolyzed to the carboxylic acid derivatives themselves by conventional means, and those of the carboxylic acid amides as defined above wherein $R^4$ and/or $R^5$ stands for an alkoxycarbonylalkyl radical may be converted into the corresponding amides wherein $R^4$ and/or $R^5$ stands for a carboxyalkyl radical by hydrolysis.

Thus, according to a further feature of the invention we provide a process for the manufacture of the esters or amides of the carboxylic acid derivatives of the invention as defined above which comprises the interaction of an activated derivative of a carboxylic acid derivative of the invention with an alcohol of the formula $R^3OH$ or $D—(OH)_n$, wherein $R^3$, D and $n$ have the meanings stated above, or with an amine of the formula $R^4R^5NH$, wherein $R^4$ and $R^5$ have the meanings stated above.

A suitable activated derivative of the carboxylic acid derivative of the invention is, for example, an acid halide, for example the acid chloride, or an acid anhydride. The last-mentioned interaction may be carried out in a diluent or solvent, for example tetrahydrofuran or benzene, and it may be carried out at ambient temperature or it may be accelerated or completed by the application of heat, for example by heating to the boiling point of the diluent or solvent. The interaction may also be accelerated by the presence of a basic catalyst, for example N,N-dimethylaniline or pyridine.

According to a further feature of the invention we provide pharmaceutical compositions which comprise as active ingredient at least one of the new carboxylic acid derivatives of the invention, or an ester or amide or salt thereof, in association with a pharmaceutically-acceptable diluent or carrier therefor.

The pharmaceutical compositions may be formulated so as to be suitable for oral administration. For such purposes the active ingredient may be mixed with suitable known pharmaceutical excipients and incorporated by known means into such formulations as tablets, capsules, aqueous or oily suspensions, emulsions, aqueous or oily solutions, dispersible powders, syrups or elixirs.

Formulation of the compositions of the invention as tablets, which may be coated and which may be either effervescent or non-effervescent, may be carried out according to the known art. Inert diluents or carriers, for example magnesium carbonate or lactose, are used together with conventional disintegrating agents, for example maize starch and aliginic acid, and lubricating agents, for example magnesium stearate.

Liquid or solid formulations may be filled into capsules for oral administration. Active ingredients which are liquids may be dissolved in oils of vegetable or animal origin, for example sunflower seed oil, maize oil or cod-liver oil, and may contain additional ingredients, for example antioxidants such as the tocopherols or wheat germ oil. Solid formulations suitable for filling into capsules may contain the solid active ingredient in admixture with solid materials which have a buffering action, for example colloidal aluminium hydroxide or calcium hydrogen phosphate. Alternatively, the liquid or solid active ingredient alone may be encased in a capsule carrier in order to provide the active ingredient in a unit dosage form.

Active ingredients which are sparingly soluble in water may be formulated as suspensions either in an aqueous base or in an emulsion base. Aqueous based suspensions are prepared with the aid of wetting agents, for example polyethyleneoxide condensation products of alkyl phenols, fatty alcohols or fatty acids, and suspending agents, for example hydrophilic colloids such as polyvinylpyrrolidone. Emulsion-based suspensions are prepared by suspending the active ingredient with the aid of wetting agents and suspending agents in the emulsion base, which is prepared with the aid of emulsifying agents such as those described below. The suspension formulations may in addition contain sweetening agents, flavoring agents, colouring materials, preservatives and anti-oxidants.

Active ingredients which are liquids at ordinary temperatures may be formulated as emulsions wherein the active ingredient itself or a solution of the active ingredient in an orally-acceptable oil, for example maize oil or cod liver oil, constitutes the oil phase. The solvent oil may itself be of use in the treatment of atherosclerosis, for example sunflower seed oil. Emulsions are prepared with the aid of emulsifying agents, examples of which are sorbitan tri-oleate, polyoxyethylene sorbitan mono-oleate, lecithin, gum acacia and gum tragacanth. The emulsions may contain in addition preservatives, antioxidants, flavouring and sweetening agents and colouring materials.

Compositions of the invention may also be in the form of a nutritive preparation in which the active ingredient is mixed with proteins and carbohydrates, for example casein.

The compositions described above may in addition contain dietary supplements, for example vitamins, for example the tocopherols; salts of glycerophosphoric acid; choline and inositol, the combination of which is known to be effective in reducing serum cholesterol levels; amino acids, for example methionine which has a lipotropic action similar to choline; and hormones or hormone extracts which may be useful in the treatment of conditions associated with old age.

The compositions of the invention may also additionally contain a steroid derivative, for example an androstane derivative, for example androsterone or its acetate or propionate.

Syrups or elixirs suitable for oral administration may be prepared from water soluble salts and may advantageously contain glycerol and ethyl alcohol as solvents or preservatives. They may in addition contain sweetening agents and flavouring agents, for example essential oils and colouring materials.

The compositions of the invention are useful in the treatment of atherosclerosis in the same way as compositions of the widely used therapeutic agent clofibrate, but at only ¼ to ½₀₀th of the dose. It is therefore recommended that the compositions be administered orally in the form of capsules containing between 0.01 and 0.5 g. of liquid or solid active ingredient or in the form of tablets, either effervescent or non-effervescent, containing between 0.01 and 0.5 g. of solid active ingredient, these compositions being administered such that a patient undergoing treatment receives between 0.01 g. and 0.5 g. of active ingredient per day.

The invention is illustrated but not limited by the following examples in which the parts are by weight:

EXAMPLE 1

A solution of 40 parts of 4-(p-chlorophenyl)benzyl alcohol in 360 parts of xylene is added at 15–20° C. during 15 minutes to a stirred suspension of 12 parts of a 50% dispersion of sodium hydride in oil in 135 parts of xylene. The mixture is stirred and heated under reflux for 2½ hours and cooled, and 40 parts of ethyl α-bromo-α-methylpropionate are added at 15–20° C. during 15 minutes. The mixture is heated under reflux for 24 hours, cooled and poured into 1,000 parts of water. The xylene layer is separated, washed with water and evaporated to dryness under reduced pressure. The residue is stirred with 250 parts of petroleum ether (B.P. 40–60° C.) and the mixture is filtered. The filtrate is evaporated to dryness under reduced pressure and to the residue are added 200 parts of ethanol, 50 parts of water and 26 parts of potassium hydroxide. The mixture is heated under reflux for 2 hours, cooled and evaporated to dryness. The residue is poured into 2,000 parts of water and the mixture is washed three times with ether. The aqueous solution is treated with charcoal, filtered and the filtrate is acidified with concentrated hydrochloric acid. The mixture is filtered and the solid product is washed with water, dried and crystallised from cyclohexane. There is thus obtained α-[4-(p-chlorophenyl)benzyloxy]-α-methylpropionic acid, M.P. 154–155° C.

The 4-(p-chlorophenyl)benzyl alcohol used as starting material may be obtained as follows:

A mixture of 63 parts of 4-(p-chlorophenyl)benzyl chloride (prepared as described in Example 2), 20 parts of anhydrous potassium acetate and 150 parts of acetic acid is stirred and heated under reflux for 18 hours. The mixture is cooled and poured into 1,000 parts of cold water and the mixture is extracted with ether. The ethereal extract is evaporated to dryness and the residual oil is heated under reflux for 5 hours with a mixture of 800 parts of ethanol, 70 parts of potassium hydroxide and 140 parts of water. The mixture is treated with charcoal and filtered and the filtrate is cooled and evaporated to dryness under reduced pressure. The residue is stirred with 1,000 parts of water for 15 minutes and the mixture is filtered. The solid residue is washed with water, dried and crystallised from a mixture of equal parts of benzene and cyclohexane. There is thus obtained 4-(p-chlorophenyl)benzyl alcohol, M.P. 134–135° C.

EXAMPLE 2

A solution of 6.6 parts of ethyl α-hydroxy-α-methylpropionate in 20 parts of dimethylformamide is added at ambient temperature during 30 minutes to a stirred mixture of 3.5 parts of a 50% dispersion of sodium hydride in oil (from which the oil has been washed with ether) and 50 parts of dimethylformamide. The mixture is stirred at ambient temperature for 1 hour, and a solution of 11.8 parts of 4-(p-chlorophenyl)benzyl chloride in 50 parts of dimethylformamide is then added at ambient temperature during 1 hour. The mixture is stirred at a temperature of 30–35° C. for 17 hours and is then evaporated to dryness. The residue is added to 500 parts of water and the mixture is extracted twice with 200 parts of ether each time. The ethereal extract is dried and evaporated to dryness, and to the residual oil are added 100 parts of ethanol, 20 parts of water and 10 parts of concentrated aqueous sodium hydroxide solution. The mixture is heated under reflux for 3 hours, cooled and evaporated to dryness, and the residue is stirred with 500 parts of water. The mixture is filtered and the filtrate is acidified with concentrated hydrochloric acid. The mixture is filtered and the solid residue is dried and crystallized from benzene. There is thus obtained α-[4-(p-chlorophenyl)benzyloxy]-α-methylpropionic acid, M.P. 154–155° C.

The 4-(p-chlorophenyl)benzyl chloride used as starting material may be obtained as follows:

200 parts of stannic chloride are added during 1 hour to a stirred solution of 280 parts of 4-chlorobiphenyl and 240 parts of ethoxymethyl chloride in 2,500 parts of ethylene dichloride which is kept at a temperature of between −2 and +2° C. The suspension is stirred for a further 5 minutes and is then poured into 1,000 parts of a mixture of ice and water. The lower organic layer is separated and washed with 200 parts of aqueous 2 N-hydrochloric acid and then with water until the organic solution is no longer acidic. The organic solution is evaporated to dryness and the residue is stirred with 800 parts of petroleum ether (B.P. 40–60° C.). The mixture is filtered and the solid is washed with 200 parts of petroleum ether (B.P. 40–60° C.). The solid consists of bis-(4-chlorobiphenyl-4'-yl)methane and is discarded.

The filtrate and washings are combined and evaporated to dryness and the residue is distilled under reduced pressure, the fraction having B.P. 140–145° C./0.2 mm. being collected. (The lower-boiling fractions are unchanged starting material and are discarded.) The required fraction solidifies on cooling and there is thus obtained 4-(p-chlorophenyl)benzyl chloride, M.P. 67–68° C.

EXAMPLE 3

The process described in Example 1 is repeated except that the 40 parts of 4-(p-chlorophenyl)benzyl alcohol are replaced by 34 parts of 4-phenylbenzyl alcohol. There is thus obtained α-(4-phenylbenzyloxy)-α-methylpropionic acid, M.P. 104° C.

EXAMPLE 4

The process described in Example 1 is repeated, except that the 40 parts of ethyl α-bromo-α-methylpropionate are replaced by 34.5 parts of ethyl α-bromoacetate. There is thus obtained α-[4-(p-chlorophenyl)benzyloxy]acetic acid, M.P. 130–132° C.

EXAMPLE 5

The process described in Example 2 is repeated except that the 11.8 parts of 4-(p-chlorophenyl)benzyl chloride are replaced by 12.6 parts of 4-(p-chlorophenoxy)benzyl chloride. There is thus obtained α-[4-(p-chlorophenoxy)benzyloxy]-α-methylpropionic acid, M.P. 98° C.

The 4-(p-chlorophenoxy)benzyl chloride used as starting material may be obtained as follows:

10 parts of stannic chloride are added during 30 minutes to a stirred solution of 20.5 parts of 4-chlorodiphenyl ether and 16.2 parts of ethoxymethyl chloride in 65 parts of ethylene dichloride which is kept at a temperature of between −2 and +2° C. The suspension is stirred for a further 5 minutes and is then poured into 250 parts of a mixture of ice and water. The lower organic layer is separated and washed successively with aqueous 2 N-hydrochloric acid, aqueous 2 N-sodium carbonate solution and water. The organic solution is dried over calcium chloride and evaporated to dryness under reduced pressure. The residual oil is treated with 80 parts of boiling methanol and the methanolic solution is decanted from insoluble matter and evaporated to dryness under reduced pressure. The residual oil is distilled under reduced pressure and there is thus obtained 4-(p-chlorophenoxy)benzylchloride, B.P. 124–126° C./0.1 mm.

EXAMPLE 6

The process described in Example 2 is repeated except that the 6.6 parts of ethyl-α-hydroxy-α-methylpropionate are replaced by 5.3 parts of methyl thioglycollate. There is thus obtained α-[4-(p-chlorophenyl)benzylthio]acetic acid, M.P. 118° C.

EXAMPLE 7

The process described in Example 2 is repeated except that the 6,6 parts of ethyl α-hydroxy-α-methylpropionate are replaced by 7.3 parts of ethyl α-hydroxy-α-methylbutyrate. There is thus obtained α-[4-(p-chlorophenyl)benzyloxy]-α-methylbutyric acid, M.P. 131–132° C.

EXAMPLE 8

12.5 parts of methyl glycinate hydrochloride are added to a stirred suspension of 4.6 parts of a 50% dispersion of sodium hydride in oil (from which the oil has been washed with ether) in 95 parts of dimethylformamide. The mixture is stirred for 15 minutes and a solution of 5.9 parts of 4-(p-chlorophenyl)benzyl chloride in 95 parts of dimethylformamide is added. The mixture is stirred for 18 hours at ambient temperature and is then evaporated to dryness under reduced pressure. 400 parts of water are added to the residual oil and the mixture is extracted twice with 80 parts of ether each time. The ethereal extract is evaporated to dryness and the residual oil is stirred with 50 parts of aqueous 2 N-hydrochloric acid. 100 parts of water are added and the mixture is boiled. The hot solution is filtered through a filter-aid and the filtrate is allowed to cool. The mixture is filtered and the solid product is washed with water, dried and crystallised twice from methanol. There is thus obtained methyl α-[4-(p-chlorophenyl)benzylamino]acetate hydrochloride, M.P. 185° C. (with decomposition).

EXAMPLE 9

A stirred suspension of 3.5 parts of α-[4-(p-chlorophenyl)-benzyloxy]-α-methylpropionic acid in 200 parts of warm 35–40° C.) water is triturated with aqueous 0.5 N-sodium hydroxide solution until the mixture is neutral. The solution is filtered through a filter-aid and the filtrate is evaporated to dryness under reduced pressure. The solid residue is dried at 100° C. under reduced pressure over phosphorus pentoxide for 24 hours, and there is thus obtained sodium α-[4-(p-chlorophenyl)benzyloxy]-α-methylpropionate hemihydrate.

EXAMPLE 10

A mixture of 2.3 parts of α-[4-(p-chlorophenyl)benzyloxy]-α-methylpropionic acid and 12 parts of thionyl chloride is heated under reflux for 10 minutes. The excess thionyl chloride is removed by evaporation under reduced pressure and the residual oil is dissolved in 20 parts of benzene. The solution is added dropwise to 20 parts of aqueous ammonia solution (specific gravity 0.88) which is stirred at 10–20° C. A further 40 parts of benzene are added and the mixture is stirred for 1 hour at ambient temperature. The benzene layer is separated, washed with water, dried and evaporated to dryness under reduced pressure. The residue is crystallised twice from cyclohexane and there is thus obtained α-[4-(p-chlorophenylbenzyloxy]-α-methylpropionamide, M.P. 138° C.

EXAMPLE 11

A mixture of 3 parts of α-[4-(p-chlorophenyl)benzyloxy]-α-methylpropionic acid and 16 parts of thionyl chloride is heated under reflux for 10 minutes. The excess thionyl chloride is removed by evaporation under reduced pressure and the residual oil is dissolved in 20 parts of benzene. The solution is added dropwise to a stirred mixture of 1 part of methylamine hydrochloride, 20 parts of benzene and 25 parts of 5% aqueous sodium bicarbonate solution which is maintained at 10–20° C. The mixture is stirred for 1 hour at ambient temperature and the benzene layer is separated, washed with water, dried and evaporated to dryness under reduced pressure. The residue is crystallised from petroleum ether (B.P. 60–80° C.) and then from cyclohexane, and there is thus obtained N-methyl-α-[4 - (p - chlorophenyl)benzyloxy]-α-methylpropionamide, M.P. 106° C.

EXAMPLE 12

A mixture of 5 parts of α-[4-(p-chlorophenyl)benzyloxy]-α-methylpropionic acid and 25 parts of thionyl chloride is heated under reflux for 15 minutes. The excess thionyl chloride is removed by evaporation under reduced pressure and the residual oil is dissolved in 20 parts of benzene. The solution is added dropwise to a stirred mixture of 2.5 parts of methyl glycinate hydrochloride, 30 parts of benzene and 35 parts of 5% aqueous sodium bicarbonate solution which is maintained at 10–20° C. The mixture is stirred for 1 hour at ambient temperature and the benzene layer is separated, washed successively with water, dilute aqueous hydrochloric acid and water, dried and evaporated to dryness under reduced pressure. The residue is crystallised three times from cyclohexane and there is thus obtained N-methoxycarbonylmethyl - α - [4 - (p-chlorophenyl)benzyloxy]-α-methylpropionamide, M.P. 96° C.

EXAMPLE 13

0.9 part of aqueous 2 N-sodium hydroxide solution is added to a solution of 0.6 part of N-methoxycarbonylmethyl-α-[4 - (p - chlorophenyl)benzyloxy]-α-methylpropionamide in 20 parts of methanol and the solution is stirred for 2 hours at ambient temperature and then added to 100 parts of water. The mixture is acidified with concentrated aqueous hydrochloric acid at 15–20° C. and the mixture is filtered. The solid residue is dried and crystallised from benzene and there is thus obtained N-carboxymethyl-α-[4 - (p - chlorophenyl)benzyloxy]-α-methylpropionamide, M.P. 143° C.

EXAMPLE 14

A solution of 3 parts of α-[4-(p-chlorophenyl)benzyloxy]-α-methylpropionic acid in 40 parts of tetrahydrofuran is added to a stirred solution of 0.45 part of diazoethane in 40 parts of ether which is maintained at 10–20° C. The solution is kept overnight at ambient temperature and is then washed successively with aqueous 2 N-hydrochloric acid, aqueous 0.5 N-sodium hydroxide solution and water, dried and evaporated to dryness under reduced pressure. The residual oil is distilled under reduced pressure and there is thus obtained ethyl α-[4-(p-chlorophenyl)benzyloxy]-α-methylpropionate, B.P. 175° C./0.3 mm., M.P. 46–47° C.

EXAMPLE 15

1.0 part of a 50% dispersion of sodium hydride in oil is added to a stirred solution of 3 parts of α-[4-(p-chlorophenyl)benzyloxy]-α-methylpropionic acid in 25 parts of dimethylformamide which is maintained at 5–10° C. The mixture is allowed to warm up to ambient temperature and is stirred at ambient temperature for 30 minutes. 1.45 parts of 2-dimethylaminoethyl chloride hydrochloride are added and the mixture is heated at 95° C. for 18 hours, cooled and evaporated to dryness under reduced pressure. The residue is stirred with 200 parts of water and the mixture is extracted twice with 80 parts of ether each time. The combined ethereal extracts are washed with aqueous 0.5 N-sodium hydroxide solution and then with water, and evaporated to dryness under reduced pressure. The residue is distilled under reduced pressure and there is thus obtained 2-dimethylaminoethyl α-[4 - (p - chlorophenyl)benzyloxy]-α-methylpropionate, B.P. 200° C./0.4 mm.

EXAMPLE 16

A mixture of 2.0 parts of α-[4-(p-chlorophenyl)benzyloxy]-α-methylpropionic acid and 10 parts of thionyl chloride is heated under reflux for 10 minutes. The excess thionyl chloride is removed by evaporation under reduced pressure and a solution of 0.63 part of 2-ethoxyethanol in 20 parts of pyridine is added. The mixture is heated at 95° C. for 30 minutes, and is then poured into 150 parts of a mixture of ice and water. The mixture is extracted twice with 40 parts of benzene each time and the combined benzene extracts are washed successively with aqueous 2 N-hydrochloric acid, aqueous 0.5 N-sodium hydroxide solution and water, dried and evaporated to dryness under reduced pressure. The residual gum is extracted with 40 parts of boiling petroleum ether (B.P. 60–80° C.) and the extract is evaporated to dryness under reduced pressure. The residual oil is distilled under reduced pressure and there is thus obtained 2-ethoxyethyl α-[4-(p-chlorophenyl)benzyloxy]-α-methylpropionate, B.P. 195° C./0.1 mm.

EXAMPLE 17

A mixture of 1.15 parts of 4-(p-tolylthio)benzyl alcohol and 1.5 parts of thionyl chloride is heated at 60° C. for 5 minutes and the excess thionyl chloride is then removed by evaporation under reduced pressure. The residue is dissolved in 5 parts of acetone and to this solution is added a solution of 0.8 part of sodium iodide in 5 parts of acetone. The mixture is evaporated to dryness and there is thus obtained as residue a mixture containing 4-(p-tolylthio)benzyl iodide and sodium chloride.

0.24 part of a 50% dispersion of sodium hydride in oil is added to a solution of 0.6 part of ethyl α-hydroxy-α-methylpropionate in 10 parts of benzene, and the mixture is stirred for 30 minutes. The mixture is added to the mixture containing 4-(p-tolylthio)benzyl iodide described above, and the mixture is heated under reflux for 18 hours. The mixture is evaporated to dryness and to the residue are added 20 parts of ethanol, 2 parts of water and 0.5 part of sodium hydroxide. The mixture is heated under reflux for one hour and then evaporated to dryness. The residue is boiled with 100 parts of water, 10 parts of a filter-aid are added and the mixture is filtered. The filtrate is cooled and acidified with aqueous hydrochloric acid. The mixture is filtered and the residue is washed with water, dried and crystallised from petroleum ether (B.P. 60–80° C.). There is thus obtained α-[4 - (p - tolylthio)benzyloxy]-α-methylpropionic acid, M.P. 96° C.

The 4-(p-tolylthio)benzyl alcohol used as starting material may be obtained as follows:

A solution of 7.6 parts of sodium nitrite in 15 parts of water is added during 15 minutes to a stirred suspension of 16.5 parts of ethyl p-aminobenzoate in a mixture of 100 parts of water and 26 parts of concentrated hydrochloric acid which is maintained at 3–5° C. The solution is stirred for 15 minutes at 5° C., filtered and the filtrate is added during 15 minutes to a stirred solution of 13.6 parts of p-thiocresol and 21 parts of sodium hydroxide in 100 parts of water which is maintained at 50–55° C. The solution is heated at 50–55° C. for a further 30 minutes, warmed up to 95° C. during 30 minutes and finally heated at 95° C. for 3 hours. The solution is cooled and filtered and the filtrate is acidified with concentrated aqueous hydrochloric acid. The mixture is filtered, the solid residue is washed with water and the damp solid is extracted with 400 parts of boiling benzene. The benzene solution is decanted from insoluble material, treated with charcoal and filtered and the filtrate is evaporated to dryness under reduced pressure. The residue is stirred with 250 parts of aqueous N-sodium carbonate solution, the mixture is treated with charcoal and filtered and the filtrate is acidified with concentrated aqueous hydrochloric acid. The mixture is filtered and the yellow precipitate is washed with water, dried, and crystallised from methanol. There is thus obtained 4-(p-tolylthio)benzoic acid, M.P. 193–194° C.

A solution of 5 parts of 4-(p-tolylthio)benzoic acid in 40 parts of tetrahydrofuran is added during 15 minutes to a stirred suspension of 1.2 parts of lithium aluminium hydride in 40 parts of tetrahydrofuran which is maintained at 10–15° C. The mixture is allowed to warm up to 32° C. during 30 minutes and is then heated at 40° C. for a further 30 minutes. The mixture is cooled to 10–20° C. and to it are added successively 20 parts of ethyl acetate and 20 parts of water. The mixture is evaporated to dryness under reduced pressure and the residue is stirred with a mixture of 150 parts of ether and 200 parts of aqueous 5 N-hydrochloric acid. The ethereal layer is separated and the aqueous layer is extracted with 80 parts of ether. The combined ethereal solutions are washed successively with aqueous 2 N-hydrochloric acid, water, aqueous 0.5 N-sodium hydroxide solution and water, dried and evaporated to dryness under reduced pressure. The residual solid is crystallised from cyclohexane and there is thus obtained 4-(p-tolylthio)benzyl alcohol, M.P. 72–73° C.

EXAMPLE 18

The process described in Example 17 is repeated except that the 1.15 parts of 4-(p-tolylthio)benzyl alcohol are replaced by 1.15 parts of 4-(p-chlorobenzyl)benzyl alcohol. There is thus obtained α-[4-(p-chlorobenzyl)benzyloxy]-α-methylpropionic acid, M.P. 96° C.

The 4-(p-chlorobenzyl)benzyl alcohol used as starting material may be obtained as follows:

Gaseous chlorine is passed during 6 hours into 310 parts of 4-chloro-4'-methylbenzophenone which is maintained at 135° C. and which is illuminated by a 500 watt electric lamp, until an increase in weight of 43 parts is obtained. The mixture is cooled and the residue is crystallised from methanol. There is thus obtained 4-(p-chlorobenzoyl)-benzyl chloride, M.P. 103° C.

A mixture of 9 parts of 4 - (p - chlorobenzoyl)benzyl chloride, 9 parts of sodium acetate and 30 parts of acetic acid is heated at 80° C. during 18 hours, and 30 parts of water are then added. The mixture is filtered and the solid residue is crystallised from cyclohexane. There is thus obtained 4-(p - chlorobenzoyl)benzyl acetate, M.P. 98° C.

A solution of 136 parts of anhydrous aluminium chloride in 400 parts of ether is added during 15 minutes to a stirred mixture of 19 parts of lithium aluminium hydride and 1,500 parts of ether which is cooled to 10° C. The mixture is heated under reflux for 1 hour, cooled to 10° C. and a solution of 87 parts of 4-(p-chlorobenzoyl)benzyl acetate in 200 parts of ether is added during twenty minutes. The mixture is stirred and heated under reflux for 6 hours, cooled to 10° C. and 50 parts of ethyl acetate are cautiously added. The mixture is poured into dilute aqueous sulphuric acid and the ethereal phase is separated, washed with water and evaporated to dryness. The residual oil is heated under reflux for 1 hour with a mixture of 1,000 parts of ethanol, 100 parts of water and 20 parts of sodium hydroxide. The mixture is evaporated to dryness and the residue is extracted with ether. The ethereal solution is washed with water and evaporated to dryness. The residue is crystallised from petroleum ether (B.P. 60–80° C.) and there is thus obtained 4-(p-chlorobenzyl)benzyl alcohol, M.P. 78° C.

EXAMPLE 19

A solution of 0.2 part of potassium permanganate in 5 parts of water is added during 10 minutes to a stirred solution of 0.05 part of α-[4-(p-tolylthio)benzyloxy]-α-methylpropionic acid in 15 parts of acetic acid which is maintained below 20° C. The mixture is stirred for a further hour and sulphur dioxide is then passed into the mixture until the solution is colourless. The solution is evaporated to dryness and the residue is stirred with water. The mixture is filtered and the solid is dried and crystallised from benzene. There is thus obtained α-[4-(p-tolylsulphonyl)benzyloxy] - α-methylpropionic acid, M.P. 283° C.

EXAMPLE 20

The process described in Example 2 is repeated except that the 6.6 parts of ethyl α-hydroxy-α-methylpropionate are replaced by 5.2 parts of methyl lactate. There is thus obtained α - [4-(p-chlorophenyl)benzyloxy]propionic acid, M.P. 133° C.

EXAMPLE 21

A solution of 0.45 part of potassium permanganate in 20 parts of water is added during 30 minutes to a stirred solution of 0.3 part of α-[4-(p-chlorophenyl)benzylthio]acetic acid in 20 parts of glacial acetic acid which is maintained at 20–22° C. The mixture is stirred for a further 1 hour at ambient temperature, and gaseous sulphur dioxide is then bubbled into the mixture at a temperature of 10–15° C. until all the manganese dioxide has dissolved. The mixture is filtered, and the solid residue is washed with water, dried and crystallised from 50% aqueous methanol. There is thus obtained α-[4-(p-chlorophenyl)benzylsulphonyl]acetic acid, M.P. 220° C. (with decomposition).

EXAMPLE 22

To a mixture of 1 part of ethyl α-[4-(p-chlorophenyl)benzyloxy]-α-methylpropionate and 33.7 parts of liquid paraffin are added 3 parts of gum acacia and 1.5 parts of gum tragacanth. To the thoroughly triturated mixture is added slowly with stirring a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of edible dyestuff in 110 parts of water. After the incorporation of a suitable flavoring agent, the mixture is homogenised by passage through a conventional homogeniser and there is thus obtained an emulsion suitable for oral administration for therapeutic purposes.

EXAMPLE 23

In a similar manner to that described in Example 22 but replacing the 33.7 parts of liquid paraffin by 30 parts of maize oil containing 0.01 part of propyl gallate, there is obtained an emulsion suitable for oral administration for therapeutic purposes.

EXAMPLE 24

5 parts of calcium α-[4-(p-chlorophenyl)benzyloxy]-α-methylpropionate are added to a solution of 15 parts of calcium cyclamate, 2 parts of a condensation product of octylcresol with 8–10 molecular proportions of ethylene oxide, 3 parts of polyvinyl pyrrolidone and 0.9 part of methyl p-hydroxybenzoate in 500 parts of water. The mixture is ball-milled for several hours and after the incorporation of a suitable flavoring agent there is obtained a suspension suitable for oral administration for therapeutic purposes.

EXAMPLE 25

A mixture of 1 part of α-[4-(p-chlorophenyl)benzyloxy]-α-methylpropionic acid, 40 parts of sucrose, 0.5 part of a cetyl alcohol polyethylene oxide condensate, 1 part of polyvinyl pyrrolidone, 0.25 part of methyl p-hydroxybenzoate and 100 parts of water is ball-milled for several hours. After the incorporation of suitable coloring and flavoring agents there is obtained a suspension suitable for oral administration for therapeutic purposes.

EXAMPLE 26

10 parts of sodium α-[4-(p-chlorophenyl)benzyloxy]-α-methyl-propionate are dissovled in a mixture of 83 parts of water, 250 parts of glycerol and 125 parts of ethyl alcohol. To the resultant solution is added a solution of 300 parts of sucrose in 150 parts of water. By the incorporation of a suitable flavoring agent and coloring matter, there is obtained a syrup suitable for oral administration for therapeutic purposes.

EXAMPLE 27

25 parts of sodium glycerophosphate, 25 parts of calcium glycerophosphate and 5 parts of calcium α-[4-(p-chlorophenyl)benzyloxy]-α-methylpropionate are intimately mixed. The mixture is added gradually to 900 parts of soluble casein in a conventional mixer and mixing is contained until homogeneous. There is thus obtained a dietary supplement suitable for oral administration for therapeutic purposes.

EXAMPLE 28

An intimate mixture is prepared with conventional mixing equipment of 3 parts of pyridoxine hydrochloride, 100 parts of nicotinic acid, 100 parts of nicotinamide, 5 parts of methionine, 15 parts of choline bitartrate, 150 parts of ascorbic acid, 5 parts of calcium pantothenate, 10 parts of riboflavin and 50 parts of calcium α[4-(p-chlorophenyl)benzyloxy]-α-methylpropionate. The mixture is filled into capsules which are then suitable for oral administration for therapeutic purposes.

EXAMPLE 29

A mixture of 100 parts of calcium α-[4-(p-chlorophenyl)benzyloxy]-α-methylpropionate, 94 parts of maize starch, 45 parts of alginic acid and 3.5 parts of magnesium stearate, is compressed into slugs which are then broken into granules. The granules are passed through an 8-mesh screen and 3.5 parts of magnesium stearate are added. The mixture is then compressed into tablets which are suitable for oral administration for therapeutic purposes.

EXAMPLE 30

A mixture of 1 part of sodium di-octyl sulphosuccinate dissolved in a sufficient quantity of methanol, 100 parts of calcium α-[4-(p-chlorophenyl)benzyloxy]-α-methylpropionate, 75 parts of maize starch and 5 parts of alginic acid is granulated by admixture with a sufficient quantity of aqueous 10% maize starch paste. The granules are passed through a 12-mesh screen and dried at 50–55° C. The granules are then again passed through a 12-mesh screen and 6 parts of magnesium stearate are added and the mixture is compressed. There are thus obtained tablets suitable for oral administration for therapeutic purposes.

EXAMPLE 31

A mixture of 100 parts of sodium α-[4-(p-chlorophenyl)benzyloxy]-α-methylpropionate, 50 parts of light magnesium carbonate and 10 parts of magnesium stearate is compressed into slugs. The slugs are broken into granules which are passed through an 8-mesh screen and compressed. There are thus obtained tablets suitable for oral administration for therapeutic purposes.

EXAMPLE 32

A mixture of 100 parts of sodium α-[4-(p-chlorophenyl)benzyloxy]-α-methylpropionate and 50 parts of light magnesium carbonate is granulated by admixture with a solution of 2 parts of sodium di-octyl sulphosuccinate in a sufficient quantity of methanol. The granules are passed through a 12-mesh screen and dried at 50–55° C. The granules are then again passed through a 12-mesh screen and 8 parts of magnesium stearate are added and the mixture is compressed. There are thus obtained tablets suitable for oral administration for therapeutic purposes.

EXAMPLE 33

A mixture of 100 parts of α-[4-(p-chlorophenyl)benzyloxy]-α-methylpropionic acid, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol; 3 parts of magnesium stearate are then added to the granules after which they are compressed to give tablets suitable for oral use for therapeutic purposes.

The α-[4-(p-chlorophenyl)benzyloxy]-α-methylpropionic acid or the salts thereof used in any of the above Examples 24 to 33 may be replaced by an equal amount of any other of the active ingredients hereinbefore particularly described, and there are thus obtained in similar manner pharmaceutical compositions suitable for oral administration for therapeutic purposes.

EXAMPLE 34

A solution of 10 parts of ethyl α-[4-(p-chlorophenyl)benzyloxy]-α-methylpropionate in 190 parts of wheat germ oil is filled into soft gelatin capsules. There are thus obtained capsules suitable for oral administration for therapeutic purposes.

EXAMPLE 35

A solution of 10 parts of ethyl α-[4-(p-chlorophenyl)benzyloxy]-α-methylpropionate and 50 parts of ±α-tocopheryl acetate in 140 parts of maize oil is filled into soft gelatin capsules. There are thus obtained capsules suitable for oral administration for therapeutic purposes.

EXAMPLE 36

A mixture of 50 parts of ethyl α-[4-(p-chlorophenyl)benzyloxy]-α-methylpropionate, 203.5 parts of lactose, 9 parts of alginic acid, 15 parts of maize starch and 45 parts of a 10% aqueous solution of gelatin is granulated and passed through a 16 mesh screen. The granules are dried at 50–55° C. and passed through a 20 mesh screen, and 15 parts of maize starch and 3 parts of magnesium stearate are added. The mixture is then compressed into tablets which are suitable for oral administration for therapeutic purposes.

What we claim is:

1. A pharmaceutical composition for lowering the concentration of triglycerides in the blood which comprises as active ingredient, a therapeutically effective amount of a compound selected from the group consisting of acids of the formula:

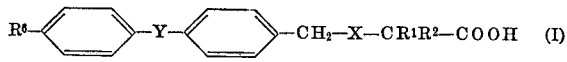

wherein X is oxygen, Y is a direct linkage, $R^1$ and $R^2$, which may be the same or different, are alkyl of 1–4 carbon atoms and $R^6$ is hydrogen or halogen; the esters derived from an acid of the Formula I and an alcohol of the formula $R^3OH$, wherein $R^3$ is alkyl of 1–4 carbon atoms, or alkyl of 2–4 carbon atoms substituted by alkoxy of 1–4 carbon atoms or dialkylamino wherein each alkyl is of 1–4 carbon atoms; the amides derived from an acid of the Formula I and an amine of the formula $R^4R^5NH$ wherein $R^4$ is hydrogen and $R^5$ is hydrogen, alkyl of 1–4 carbon atoms or alkyl of 1–4 carbon atoms which is substituted by carboxy or by alkoxycarbonyl of 2–5 carbon atoms; and the alkali metal, alkaline earth metal, aluminium, bismuth and ammonium salts of acids of the Formula I, in association with a pharmaceutically-acceptable carrier therefor.

2. The composition of claim 1 wherein, in the active ingredient, $R^1$ is methyl or ethyl, $R^2$ is methyl or ethyl and $R^6$ is chlorine.

3. The composition of claim 2 which is suitable for oral administration and which is in the form of a tablet, capsule, aqueous or oily suspension, emulsion, aqueous or oily solution, dispersible powder, syrup or elixir.

4. The composition of claim 3 wherein the active ingredient is α-[4 - (p-chlorophenyl)benzyloxy]-α-methylpropionic acid.

5. The composition of claim 4 which is a tablet containing between 0.01 and 0.5 g. of α-[4-(p-chlorophenyl)benzyloxy]-α-methylpropionic acid.

6. A method for lowering the concentration of triglycerides in the blood of a patient in need of such treatment, which comprises orally administering to such a patient an effective amount of the composition claimed in claim 1.

7. The method of claim 6 wherein, in the active ingredient of the composition, $R^1$ is methyl or ethyl, $R^2$ is methyl or ethyl and $R^6$ is chlorine.

8. The method of claim 6 wherein the composition is in the form of a tablet, capsule, aqueous or oily suspension, emulsion, aqueous or oily solution, dispersible powder, syrup or elixir.

9. The method of claim 6 wherein the active ingredient in the composition is α-[4-(p-chlorophenyl)benzyloxy]-α-methylpropionic acid.

10. The method of claim 6 wherein the composition is a tablet containing between 0.01 and 0.5 g. of α-[4-(p-chlorophenyl)benzyloxy]-α-methylpropionic acid.

11. The composition of claim 1 wherein $R^6$ is chlorine or bromine; $R^3$ is ethyl or propyl substituted by methoxy or ethoxy; and $R^5$ is alkyl of 1–4 carbon atoms substituted by methoxy carbonyl or ethoxy carbonyl.

References Cited

UNITED STATES PATENTS

| | | | |
|---|---|---|---|
| 3,332,842 | 7/1967 | Bencze | 424—317 X |
| 3,364,249 | 1/1968 | Bolhofer | 260—516 X |
| 3,449,419 | 6/1969 | Wechter | 424—324 X |

FOREIGN PATENTS

| | | | |
|---|---|---|---|
| 620,412 | 5/1961 | Canada | 424—317 |

ALBERT T. MEYERS, Primary Examiner

D. J. FUNDERBURK, Assistant Examiner

424—296, 308, 324

U.S. Cl. X.R.